(12) United States Patent
Cheng et al.

(10) Patent No.: US 6,717,577 B1
(45) Date of Patent: Apr. 6, 2004

(54) VERTEX CACHE FOR 3D COMPUTER GRAPHICS

(75) Inventors: Howard H. Cheng, Redmond, WA (US); Robert Moore, Redmond, WA (US); Farhad Fouladi, Palo Alto, CA (US); Timothy J. Van Hook, Atherton, CA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/465,754

(22) Filed: Dec. 17, 1999

Related U.S. Application Data
(60) Provisional application No. 60/161,915, filed on Oct. 28, 1999.

(51) Int. Cl.⁷ .............................................. G06T 15/00
(52) U.S. Cl. .................................... 345/419; 345/557
(58) Field of Search .......................... 345/503, 430, 345/526, 420, 502, 582, 506, 522, 419, 423, 441, 501, 568, 537, 557; 711/118, 133, 128; 365/230.03; 716/20; 707/101

(56) References Cited

U.S. PATENT DOCUMENTS

| | | | |
|---|---|---|---|
| 4,275,413 A | 6/1981 | Sakamoto et al. | |
| 4,357,624 A | 11/1982 | Greenberg | |
| 4,463,380 A | 7/1984 | Hooks, Jr. | |

(List continued on next page.)

FOREIGN PATENT DOCUMENTS

| | | |
|---|---|---|
| EP | 0 637 813 A2 | 2/1995 |
| JP | 9-330230 | 12/1997 |
| WO | WO/93/04429 | 3/1993 |

OTHER PUBLICATIONS

GDC 2000: Advanced OpenGL Game Development, "A Practical and Robust Bump-mapping Technique for Today's GPUs," by Mark Kilgard, Jul. 5, 2000, www.nvidia.com.

Technical Presentations: "Texture Space Bump Mapping," Sim Dietrich, Nov. 10, 2000, www.nvidia.com.

Whitepapers: "Texture Addressing," Sim Dietrich, Jan. 6, 2000, www.nvidia.com.

ZDNet Reviews, from PC Magazine, "Other Enhancements," Jan. 15, 1999, wysiwyg://16/http://www4.zdnet.com...ies/reviews/0,4161,2188286,00.html.

ZDNet Reviews, from PC Magazine, "Screen Shot of Alpha–channel Transparency," Jan. 15, 1999, wysiwyg://16/http://www4.zdnet.com...ies/reviews/0,4161,2188286,00.html.

(List continued on next page.)

Primary Examiner—Matthew C. Bella
Assistant Examiner—Dalip K. Singh
(74) Attorney, Agent, or Firm—Nixon & Vanderhye PC

(57) ABSTRACT

In a 3D interactive computer graphics system such as a video game display system, polygon vertex data is fed to a 3D graphics processor/display engine via a vertex cache used to cache and organize indexed primitive vertex data streams. The vertex cache may be a small, low-latency cache memory local to the display engine hardware. Polygons can be represented as indexed arrays, e.g., indexed linear lists of data components representing some feature of a vertex (for example, positions, colors, surface normals, or texture coordinates). The vertex cache can fetch the relevant blocks of indexed vertex attribute data on an as-needed basis to make it available to the display processor—providing spatial locality for display processing without requiring the vertex data to be prestored in display order. Efficiency can be increased by customizing and optimizing the vertex cache and associated tags for the purpose of delivering vertices to the graphics engine—allowing more efficient prefetching and assembling of vertices than might be possible using a general-purpose cache and tag structure.

21 Claims, 10 Drawing Sheets

U.S. PATENT DOCUMENTS

| | | |
|---|---|---|
| 4,586,038 A | 4/1986 | Sims et al. |
| 4,600,919 A | 7/1986 | Stern |
| 4,615,013 A | 9/1986 | Yan et al. |
| 4,625,289 A | 11/1986 | Rockwood |
| 4,692,880 A | 9/1987 | Merz et al. |
| 4,808,988 A | 2/1989 | Burke et al. |
| 4,817,175 A | 3/1989 | Tenenbaum et al. |
| 4,855,934 A | 8/1989 | Robinson |
| 4,888,712 A | 12/1989 | Barkans et al. |
| 4,897,806 A | 1/1990 | Cook et al. |
| 4,907,174 A | 3/1990 | Priem |
| 4,918,625 A | 4/1990 | Yan |
| 4,935,879 A | 6/1990 | Ueda |
| 4,974,176 A | 11/1990 | Buchner et al. |
| 4,974,177 A | 11/1990 | Nishiguchi |
| 4,989,138 A | 1/1991 | Radochonski |
| 5,003,496 A | 3/1991 | Hunt, Jr. et al. |
| 5,016,183 A | 5/1991 | Shyona |
| 5,018,076 A | 5/1991 | Johary et al. |
| 5,043,922 A | 8/1991 | Matsumoto |
| 5,062,057 A | 10/1991 | Blacken et al. |
| 5,091,967 A | 2/1992 | Ohsawa |
| 5,097,427 A | 3/1992 | Lathrop et al. |
| 5,144,291 A | 9/1992 | Nishizawa |
| 5,204,944 A | 4/1993 | Wolberg et al. |
| 5,224,208 A | 6/1993 | Miller, Jr. et al. |
| 5,239,624 A | 8/1993 | Cook et al. |
| 5,241,658 A | 8/1993 | Masterson et al. |
| 5,255,353 A | 10/1993 | Itoh |
| 5,268,995 A | 12/1993 | Diefendorff et al. |
| 5,268,996 A | 12/1993 | Steiner et al. |
| 5,278,948 A | 1/1994 | Luken, Jr. |
| 5,307,450 A | 4/1994 | Grossman |
| 5,315,692 A | 5/1994 | Hansen et al. |
| 5,345,541 A | 9/1994 | Kelley et al. |
| 5,353,424 A * | 10/1994 | Partovi et al. ............... 711/128 |
| 5,357,579 A | 10/1994 | Buchner et al. |
| 5,361,386 A | 11/1994 | Watkins et al. |
| 5,363,475 A | 11/1994 | Baker et al. |
| 5,377,313 A | 12/1994 | Scheibl |
| 5,394,516 A | 2/1995 | Winser |
| 5,402,532 A | 3/1995 | Epstein et al. |
| 5,404,445 A | 4/1995 | Matsumoto |
| 5,408,650 A | 4/1995 | Arsenault |
| 5,412,796 A | 5/1995 | Olive |
| 5,415,549 A | 5/1995 | Logg |
| 5,416,606 A | 5/1995 | Katayama et al. |
| 5,422,997 A | 6/1995 | Nagashima |
| 5,432,895 A | 7/1995 | Myers |
| 5,432,900 A | 7/1995 | Rhodes et al. |
| 5,438,663 A | 8/1995 | Matsumoto et al. |
| 5,448,689 A | 9/1995 | Matsuo et al. |
| 5,461,712 A | 10/1995 | Chelstowski et al. |
| 5,467,438 A | 11/1995 | Nishio et al. |
| 5,467,459 A | 11/1995 | Alexander et al. |
| 5,469,535 A | 11/1995 | Jarvis et al. |
| 5,473,736 A | 12/1995 | Young |
| 5,475,803 A | 12/1995 | Stearns et al. |
| 5,487,146 A | 1/1996 | Guttag et al. |
| 5,490,240 A | 2/1996 | Foran et al. |
| 5,495,563 A | 2/1996 | Winser |
| 5,504,499 A | 4/1996 | Horie et al. |
| 5,506,604 A | 4/1996 | Nally et al. |
| 5,535,374 A | 7/1996 | Olive |
| 5,543,824 A | 8/1996 | Priem et al. |
| 5,544,292 A | 8/1996 | Winser |
| 5,548,709 A | 8/1996 | Hannah et al. |
| 5,553,228 A | 9/1996 | Erb et al. |
| 5,557,712 A | 9/1996 | Guay |
| 5,559,954 A | 9/1996 | Sakoda et al. |
| 5,561,746 A | 10/1996 | Murata et al. |
| 5,561,752 A | 10/1996 | Jevans |
| 5,563,989 A | 10/1996 | Billyard |
| 5,566,285 A | 10/1996 | Okada |
| 5,573,402 A | 11/1996 | Gray |
| 5,579,456 A | 11/1996 | Cosman |
| 5,582,451 A | 12/1996 | Baumann |
| 5,586,234 A | 12/1996 | Sakuraba et al. |
| 5,593,350 A | 1/1997 | Bouton et al. |
| 5,600,763 A | 2/1997 | Greene et al. |
| 5,606,650 A | 2/1997 | Kelley et al. |
| 5,607,157 A | 3/1997 | Nagashima |
| 5,608,864 A | 3/1997 | Bindlish et al. |
| 5,616,031 A | 4/1997 | Logg |
| 5,621,867 A | 4/1997 | Murata et al. |
| 5,628,686 A | 5/1997 | Svancarek et al. |
| 5,638,535 A | 6/1997 | Rosenthal et al. |
| 5,644,364 A | 7/1997 | Kurtze et al. |
| 5,649,082 A | 7/1997 | Burns |
| 5,650,955 A | 7/1997 | Puar et al. |
| 5,651,104 A | 7/1997 | Cosman |
| 5,657,045 A | 8/1997 | Katsura et al. |
| 5,657,443 A | 8/1997 | Krech, Jr. |
| 5,657,478 A | 8/1997 | Recker et al. |
| 5,659,671 A | 8/1997 | Tannenbaum et al. |
| 5,659,673 A | 8/1997 | Nonoshita |
| 5,659,715 A | 8/1997 | Wu et al. |
| 5,664,162 A | 9/1997 | Dye |
| 5,666,439 A | 9/1997 | Ishida et al. |
| 5,678,037 A | 10/1997 | Osugi et al. |
| 5,682,522 A | 10/1997 | Huang et al. |
| 5,684,941 A | 11/1997 | Dye |
| 5,687,304 A | 11/1997 | Kiss |
| 5,691,746 A | 11/1997 | Shyu |
| 5,694,143 A | 12/1997 | Fielder et al. |
| 5,696,892 A | 12/1997 | Redmann et al. |
| 5,703,806 A | 12/1997 | Puar et al. |
| 5,706,481 A | 1/1998 | Hannah et al. |
| 5,706,482 A | 1/1998 | Matsushima et al. |
| 5,714,981 A | 2/1998 | Scott-Jackson et al. |
| 5,724,561 A | 3/1998 | Tarolli et al. |
| 5,726,689 A | 3/1998 | Negishi et al. |
| 5,726,947 A * | 3/1998 | Yamazaki et al. ...... 365/230.03 |
| 5,734,386 A | 3/1998 | Cosman |
| 5,739,819 A | 4/1998 | Bar-Nahum |
| 5,740,343 A | 4/1998 | Tarolli et al. |
| 5,740,383 A | 4/1998 | Nally et al. |
| 5,742,749 A | 4/1998 | Foran et al. |
| 5,742,788 A | 4/1998 | Priem et al. |
| 5,745,118 A | 4/1998 | Alcorn et al. |
| 5,745,125 A * | 4/1998 | Deering et al. .............. 345/503 |
| 5,748,199 A | 5/1998 | Palm |
| 5,748,986 A | 5/1998 | Butterfield et al. |
| 5,751,291 A | 5/1998 | Olsen et al. |
| 5,751,292 A | 5/1998 | Emmot |
| 5,751,295 A | 5/1998 | Becklund et al. |
| 5,751,930 A | 5/1998 | Katsura et al. |
| 5,754,191 A | 5/1998 | Mills et al. |
| 5,757,382 A | 5/1998 | Lee |
| 5,760,783 A | 6/1998 | Migdal et al. |
| 5,764,228 A | 6/1998 | Baldwin |
| 5,764,237 A | 6/1998 | Kaneko |
| 5,767,856 A | 6/1998 | Peterson et al. |
| 5,767,858 A | 6/1998 | Kawase et al. |
| 5,768,629 A | 6/1998 | Wise et al. |
| 5,777,623 A | 7/1998 | Small |
| 5,781,927 A | 7/1998 | Wu et al. |
| 5,791,994 A | 8/1998 | Hirano et al. |
| 5,801,711 A | 9/1998 | Koss et al. |
| 5,801,720 A * | 9/1998 | Norrod et al. .............. 345/526 |
| 5,805,175 A | 9/1998 | Priem |

| Patent No. | Date | Inventor |
|---|---|---|
| 5,808,619 A | 9/1998 | Choi et al. |
| 5,808,630 A | 9/1998 | Pannell |
| 5,809,219 A | 9/1998 | Pearce et al. |
| 5,809,278 A | 9/1998 | Watanabe et al. |
| 5,815,165 A | 9/1998 | Blixt |
| 5,818,456 A | 10/1998 | Cosman et al. |
| 5,819,017 A | 10/1998 | Akeley et al. |
| 5,821,940 A * | 10/1998 | Morgan et al. ............. 345/420 |
| 5,822,516 A | 10/1998 | Krech, Jr. |
| 5,828,382 A | 10/1998 | Wilde |
| 5,828,383 A | 10/1998 | May et al. |
| 5,828,907 A | 10/1998 | Wise et al. |
| 5,831,624 A | 11/1998 | Tarolli et al. |
| 5,831,625 A | 11/1998 | Rich et al. |
| 5,831,640 A | 11/1998 | Wang et al. |
| 5,835,096 A | 11/1998 | Baldwin |
| 5,835,792 A | 11/1998 | Wise et al. |
| 5,838,334 A | 11/1998 | Dye |
| 5,844,576 A | 12/1998 | Wilde et al. |
| 5,850,229 A | 12/1998 | Edelsbrunner et al. |
| 5,856,829 A | 1/1999 | Gray, III et al. |
| 5,859,645 A | 1/1999 | Latham |
| 5,861,888 A | 1/1999 | Dempsey |
| 5,861,893 A | 1/1999 | Stugress |
| 5,867,166 A | 2/1999 | Myhrvold et al. |
| 5,870,097 A | 2/1999 | Snyder et al. |
| 5,870,098 A | 2/1999 | Gardiner |
| 5,870,102 A | 2/1999 | Tarolli et al. |
| 5,870,109 A | 2/1999 | McCormack et al. |
| 5,870,587 A | 2/1999 | Danforth et al. |
| 5,872,902 A | 2/1999 | Kuchkuda et al. |
| 5,877,741 A | 3/1999 | Chee et al. |
| 5,877,770 A | 3/1999 | Hanaoka |
| 5,877,771 A | 3/1999 | Drebin et al. |
| 5,880,736 A | 3/1999 | Peercy et al. |
| 5,880,737 A | 3/1999 | Griffin et al. |
| 5,883,638 A | 3/1999 | Rouet et al. |
| 5,886,701 A | 3/1999 | Chauvin et al. |
| 5,886,705 A | 3/1999 | Lentz |
| 5,887,155 A | 3/1999 | Laidig |
| 5,890,190 A | 3/1999 | Rutman |
| 5,892,517 A | 4/1999 | Rich |
| 5,892,974 A | 4/1999 | Koizumi et al. |
| 5,894,300 A | 4/1999 | Takizawa |
| 5,900,881 A | 5/1999 | Ikedo |
| 5,903,283 A | 5/1999 | Selwan et al. |
| 5,909,218 A | 6/1999 | Naka et al. |
| 5,909,225 A | 6/1999 | Schinnerer et al. |
| 5,912,675 A | 6/1999 | Laperriere |
| 5,912,676 A | 6/1999 | Malladi et al. |
| 5,914,721 A | 6/1999 | Lim |
| 5,914,725 A | 6/1999 | McInnis et al. |
| 5,914,729 A | 6/1999 | Lippincott |
| 5,920,876 A | 7/1999 | Ungar et al. |
| 5,923,332 A | 7/1999 | Izawa |
| 5,923,334 A | 7/1999 | Luken |
| 5,926,182 A | 7/1999 | Menon et al. |
| 5,926,647 A | 7/1999 | Adams et al. |
| 5,933,150 A | 8/1999 | Ngo et al. |
| 5,933,154 A | 8/1999 | Howard et al. |
| 5,933,155 A | 8/1999 | Akeley |
| 5,933,529 A | 8/1999 | Kim |
| 5,936,641 A | 8/1999 | Jain et al. |
| 5,936,683 A | 8/1999 | Lin |
| 5,940,089 A | 8/1999 | Dilliplane et al. |
| 5,940,538 A | 8/1999 | Spiegel et al. |
| 5,943,058 A | 8/1999 | Nagy |
| 5,943,060 A | 8/1999 | Cosman et al. |
| 5,945,997 A | 8/1999 | Zhao et al. |
| 5,949,421 A | 9/1999 | Ogletree et al. |
| 5,949,423 A | 9/1999 | Olsen |
| 5,949,428 A | 9/1999 | Toelle et al. |
| 5,956,042 A | 9/1999 | Tucker et al. |
| 5,956,043 A | 9/1999 | Jensen |
| 5,958,020 A | 9/1999 | Evoy et al. |
| 5,959,640 A | 9/1999 | Rudin et al. |
| 5,963,220 A | 10/1999 | Lee et al. |
| 5,966,134 A | 10/1999 | Arias |
| 5,977,979 A | 11/1999 | Clough et al. |
| 5,977,984 A | 11/1999 | Omori |
| 5,982,376 A | 11/1999 | Abe et al. |
| 5,982,390 A | 11/1999 | Stoneking et al. |
| 5,986,659 A | 11/1999 | Gallery et al. |
| 5,986,663 A | 11/1999 | Wilde |
| 5,986,677 A | 11/1999 | Jones et al. |
| 5,987,567 A | 11/1999 | Rivard et al. |
| 5,990,903 A | 11/1999 | Donovan |
| 5,995,120 A | 11/1999 | Dye |
| 5,995,121 A | 11/1999 | Alcokrn et al. |
| 5,999,189 A | 12/1999 | Kaiiya et al. |
| 5,999,198 A | 12/1999 | Horan et al. |
| 6,002,407 A | 12/1999 | Fadden |
| 6,002,410 A | 12/1999 | Battle |
| 6,005,582 A | 12/1999 | Gabriel et al. |
| 6,005,583 A | 12/1999 | Morrison |
| 6,005,584 A | 12/1999 | Kitamura et al. |
| 6,007,428 A | 12/1999 | Nishiumi et al. |
| 6,008,820 A | 12/1999 | Chauvin et al. |
| 6,011,562 A | 1/2000 | Gagne et al. |
| 6,011,565 A | 1/2000 | Kuo et al. |
| 6,014,144 A | 1/2000 | Nelson et al. |
| 6,016,150 A | 1/2000 | Lengvel et al. |
| 6,016,151 A | 1/2000 | Lin |
| 6,018,350 A | 1/2000 | Lee et al. |
| 6,020,931 A | 2/2000 | Bilbrey et al. |
| 6,021,417 A | 2/2000 | Massarksy |
| 6,022,274 A | 2/2000 | Takeda et al. |
| 6,023,261 A | 2/2000 | Ugaiin |
| 6,026,182 A | 2/2000 | Lee et al. |
| 6,028,608 A | 2/2000 | Jenkins |
| 6,031,542 A | 2/2000 | Wittig |
| 6,035,360 A | 3/2000 | Doidge et al. |
| 6,037,948 A | 3/2000 | Liepa |
| 6,038,031 A | 3/2000 | Murphy |
| 6,038,348 A | 3/2000 | Carlev |
| 6,040,843 A | 3/2000 | Monroe et al. |
| 6,040,844 A | 3/2000 | Yamaguchi et al. |
| 6,041,010 A | 3/2000 | Puar et al. |
| 6,043,804 A | 3/2000 | Greene |
| 6,043,821 A | 3/2000 | Sprague et al. |
| 6,046,746 A | 4/2000 | Deering |
| 6,046,747 A | 4/2000 | Saunders et al. |
| 6,046,752 A | 4/2000 | Kirkland et al. |
| 6,049,337 A | 4/2000 | Van Overveld |
| 6,049,338 A | 4/2000 | Anderson et al. |
| 6,052,125 A | 4/2000 | Gardiner et al. |
| 6,052,126 A | 4/2000 | Sakuraba et al. |
| 6,052,127 A | 4/2000 | Vaswani et al. |
| 6,052,129 A | 4/2000 | Fowler et al. |
| 6,052,133 A | 4/2000 | Kang |
| 6,054,993 A | 4/2000 | Devic et al. |
| 6,054,999 A | 4/2000 | Strandberg |
| 6,057,847 A | 5/2000 | Jenkins |
| 6,057,849 A | 5/2000 | Haubner et al. |
| 6,057,851 A | 5/2000 | Luken et al. |
| 6,057,859 A | 5/2000 | Handelman et al. |
| 6,057,861 A | 5/2000 | Lee et al. |
| 6,057,862 A | 5/2000 | Margulis |
| 6,057,863 A | 5/2000 | Olarig |
| 6,061,462 A | 5/2000 | Tostevin et al. |
| 6,064,392 A | 5/2000 | Rohner |
| 6,067,098 A | 5/2000 | Dye |

| | | |
|---|---|---|
| 6,070,204 A | 5/2000 | Poisner |
| 6,072,496 A | 6/2000 | Guenter et al. |
| 6,075,543 A | 6/2000 | Akeley |
| 6,075,546 A | 6/2000 | Hussain et al. |
| 6,078,311 A | 6/2000 | Pelkey |
| 6,078,333 A | 6/2000 | Wittig et al. |
| 6,078,334 A | 6/2000 | Hanaoka et al. |
| 6,078,338 A | 6/2000 | Horan et al. |
| 6,081,274 A | 6/2000 | Shiraishi |
| 6,088,035 A | 7/2000 | Sudarsky et al. |
| 6,088,042 A | 7/2000 | Handelman et al. |
| 6,088,487 A | 7/2000 | Kurashige |
| 6,088,701 A | 7/2000 | Whaley et al. |
| 6,091,431 A | 7/2000 | Saxena et al. |
| 6,092,158 A | 7/2000 | Harriman et al. |
| 6,094,200 A | 7/2000 | Olsen et al. |
| 6,097,435 A | 8/2000 | Stanger et al. |
| 6,097,437 A | 8/2000 | Hwang |
| 6,104,415 A | 8/2000 | Gossett |
| 6,104,417 A | 8/2000 | Nielsen et al. |
| 6,105,094 A | 8/2000 | Lindeman |
| 6,108,743 A | 8/2000 | Debs et al. |
| 6,111,582 A | 8/2000 | Jenkins |
| 6,111,584 A | 8/2000 | Murphy |
| 6,115,047 A | 9/2000 | Deering |
| 6,115,049 A | 9/2000 | Winner et al. |
| 6,118,462 A | 9/2000 | Margulis |
| 6,128,026 A | 10/2000 | Brothers, III |
| 6,144,365 A | 11/2000 | Young et al. |
| 6,144,387 A | 11/2000 | Liu et al. |
| 6,151,602 A | 11/2000 | Hejlsberg et al. |
| 6,155,926 A | 12/2000 | Miyamoto et al. |
| 6,157,387 A | 12/2000 | Kotani |
| 6,166,748 A | 12/2000 | Van Hook et al. |
| 6,172,678 B1 | 1/2001 | Shiraishi |
| 6,177,944 B1 | 1/2001 | Fowler et al. |
| 6,191,794 B1 | 2/2001 | Priem et al. |
| 6,200,253 B1 | 3/2001 | Nishiumi et al. |
| 6,204,851 B1 | 3/2001 | Netschke et al. |
| 6,215,496 B1 | 4/2001 | Szeliski et al. |
| 6,215,497 B1 | 4/2001 | Leung |
| 6,226,713 B1 * | 5/2001 | Mehrotra ............... 711/118 |
| 6,232,981 B1 | 5/2001 | Gossett |
| 6,236,413 B1 | 5/2001 | Gossett et al. |
| 6,239,810 B1 | 5/2001 | Van Hook et al. |
| 6,252,608 B1 | 6/2001 | Snyder et al. |
| 6,252,610 B1 | 6/2001 | Hussain |
| 6,264,558 B1 | 7/2001 | Nishiumi et al. |
| 6,268,861 B1 | 7/2001 | Sanz-Pastor et al. |
| 6,275,235 B1 | 8/2001 | Morgan, III |
| 6,285,779 B1 | 9/2001 | Lapidous et al. |
| 6,292,194 B1 * | 9/2001 | Powll, III ............... 345/430 |
| 6,329,997 B1 | 12/2001 | Wu et al. |
| 6,331,856 B1 | 12/2001 | Van Hook et al. |
| 6,339,428 B1 | 1/2002 | Fowler et al. |
| 6,342,892 B1 | 1/2002 | Van Hook et al. |
| 6,353,438 B1 | 3/2002 | Van Hook et al. |
| 6,356,497 B1 | 3/2002 | Puar et al. |
| 6,408,362 B1 * | 6/2002 | Arimilli et al. ............ 711/133 |
| 6,417,858 B1 | 7/2002 | Bosch et al. |
| 6,426,747 B1 | 7/2002 | Hoppe et al. |
| 6,437,781 B1 | 8/2002 | Tucker et al. |
| 6,459,429 B1 | 10/2002 | Deering |
| 6,466,223 B1 | 10/2002 | Dorbie et al. |
| 6,469,707 B1 | 10/2002 | Voorhies |
| 6,476,808 B1 | 11/2002 | Kuo et al. |
| 6,476,822 B1 | 11/2002 | Burbank |
| 6,496,187 B1 | 12/2002 | Deering et al. |

OTHER PUBLICATIONS

Alpha (transparency) Effects, Future Technology Research Index, http://www.futuretech.vuurwerk.n1/alpha.html.

Blythe, David, 5.6 Transparency Mapping and Trimming with Alpha, http://toolbox.sgi.com/TasteOfDT/d...penGL/advanced 98/notes/node41.html, Jun. 11, 1998.

10.2 Alpha Blending, http://www.sgi.com/software/opengl/advanced98/notes/node146.html.

10.3 Sorting, http://www.sgi.com/software/opengl/advanced98/notes/node147.html.

10.4 Using the Alpha Function, http://www.sgi.com/software/opengl/advanced98/notes/node148.html.

Winner, Stephanie, et al., "Hardware Accelerated Rendering Of Antialiasing Using A Modified A–buffer Algorithm," Computer Graphics Proceedings, Annual Conference Series, 1997, pp 307–316.

Debevec, Paul, et al., "Efficient View–Dependent Image–Based Rendering with Projective Texture–Mapping," University of California at Berkeley.

Gibson, Simon, et al., "Interactive Rendering with Real–World Illumination," Rendering Techniques 2000; 11th Eurographics Workshop on Rendering, pp. 365–376 (Jun. 2000).

Segal, Mark, et al., "Fast Shadows and Lighting Effects Using Texture Mapping," Computer Graphics, 26, 2, pp.. 249–252 (Jul. 1992).

White paper, Kilgard, Mark J., "Improving Shadows and Reflections via the Stencil Buffer" (Nov. 3, 1999).

"OpenGL Projected Textures," from web site:HTTP:// reality.sgi.com, 5 pages.

"5.13.1 How to Project a Texture," from web site: www.sgi.com, 2 pages.

Arkin, Alan, email, subject: "Texture distortion problem," from web site: HTTP://reality.sgi.com (Jul. 1997).

Moller, Tomas et al., "Real–Time Rendering," pp. 179–183 (AK Peters Ltd., 1999).

Williams, Lance, "Casting Curved Shadows on Curved Surfaces," Computer Graphics (SIGGRAPH '78 Proceedings), vol. 12, No. 3, pp. 270–274 (Aug. 1978).

Woo et al., "A Survey of Shadow Algorithms," (IEEE Computer Graphics and Applications, vol. 10, No. 6, pp. 13–32 (Nov. 1990).

Heidrich et al., "Applications of Pixel Textures in Visualization and Realistic Image Synthesis," Proceedings 1999 Symposium On Interactive 3D Graphics, pp. 127–134 (Apr. 1999).

Hourcade et al, "Algorithms for Antialiased Cast Shadows", Computers and Graphics, vol. 9, No. 3, pp. 260–265 (1985).

Michael McCool, "Shadow Volume Reconstruction from Depth Maps", ACM Transactions on Graphics, vol. 19, No. 1, Jan. 2000, pp. 1–26.

RenderMan Artist Tools, PhotoRealistic RenderMan 3.8 User's Manual, Pixar (Aug. 1998).

RenderMan Interface Version 3.2 (Jul. 2000).

White paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending" (Dec. 16, 1999).

Peter J. Kovach, INSIDE DIRECT 3D, Alpha Testing, ppp 289–291 (1999).

Web site information, CartoonReyes, REM Infografica, http://www.digimotion.co.uk/cartoonreyes.htm.

Raskar, Ramesh et al., "Image Precision Silhouette Edges," Symposium on Interactive 3D Graphics 1999, Atlanta, 7 pages (Apr. 26–29, 1999).

Schlechtweg, Stefan et al., Rendering Line–Drawings with Limited Resources, Proceedings of GRAPHICON '96, 6th International Conference and Exhibition on Computer Graphics and Visualization in Russia, (St. Petersburg, Jul. 1–5, 1996) vol. 2, pp 131–137.

Haeberli, Paul et al., "Texture Mapping as a Fundamental Drawing Primitive," Proceedings of the Fourth Eurographics Workshop on Rendering, 11pages, Paris, France (Jun. 1993).

Schlechtweg, Stefan et al., "Emphasising in Line–drawings," Norsk samarbeid innen grafisk databehandling: NORSIGD Info, medlemsblad for NORSIGD, Nr 1/95, pp. 9–10.

Markosian, Lee et al., "Real–Time Nonphotorealistic Rendering," Brown University site of the NSF Science and Technology Center for Computer Graphics and Scientific Visualization, Providence, RI, 5 pages (undated).

Feth, Bill, "Non–Photorealistic Rendering," wif3@cornell.edu, CS490—Bruce Land, 5 pages (Spring 1998).

Elber, Gershon, "Line Art Illustrations of Parametric and Implicit Forms," IEEE Transactions on Visualization and Computer Graphics, vol. 4, No. 1, Jan.–Mar. 1998.

Zeleznik, Robert et al. "SKETCH: An Interface for Sketching 3D Scenes," Computer Graphics Proceedings, Annual Conference Series 1996, pp. 163–170.

Computer Graphics World, Dec. 1997.

Reynolds, Craig, "Stylized Depiction in Computer Graphics, Non–Photorealistic, Painterly and Toon Rendering," an annotated survey of online Resources, 13 pages, last update May 30, 2000, http://www.red.com/cwr/painterly.html.

Render Man Artist Tools, Using Arbitrary Output Variables in Photorealistic Renderman (With Applications), PhotoRealistic Renderman Application Note #24, 8 pages, Jun. 1998, http://www.pixar.com/products/renderman/toolkit/Toolkit/AppNotes/appnote.24.html.

Decaudin, Philippe, "Cartoon–Looking Rendering of 3D Scenes," Syntim Project Inria, 6 pages, http://www–syntim.inria.fr/syntim/recherche/decaudin/cartoon–eng.html.

Hachigian, Jennifer, "Super Cel Shader 1.00 Tips and Tricks," 2 pages, wysiwyg://thePage.13/http://members.xoom.com/_XMCM.jarvia/3D/celshade.html.

Digimation Inc., "The Incredible Comicshop," info sheet, 2 pages, http://www.digimation.com/asp/product/asp?product_id=33.

Softimage/3D Full Support, "Toon Assistant," 1998 Avid Technology, Inc., 1 page, http://www.softimage.com/3dsupport/techn...uments/3.8/features3.8/rel_notes.56.html.

Cambridge Animo—Scene III, info sheet, Cambridge Animation Systems, 2 pages, http://www.com–ani.co.uk/casweb/products/software/SceneIII.htm.

Mulligan, Vikram, Toon, info sheet, 2 pages, http://digital-carversguild.com/products/toon/toon.ttml.

Toony Shader, "Dang I'm tired of photorealism," 4 pages, http://www.visi.com/~mcdonald/toony.html.

"Cartoon Shading, Using Shading Mapping," 1 page, http://www.goat.com/alias/shader.html#toonshad.

Web site information, CartoonReyes, http://www.zentertainment.com/zentropy/review/cartoonreyes.html.

VIDI Presenter 3D Repository, "Shaders." 2 pages, http://www.webnation.com/vidirep/panels/renderman/shaders/toon.phtml.

The RenderMan Interface Version 3.1, (Sep. 1989).

"Renderman Artist Tools, PhotoRealistic RenderMan Tutorial," Pixar (Jan. 1996).

Web site materials, "Renderman Artist Tools, PhotoRealistic RenderMan 3.8 User's Manual," Pixar.

NVIDIA.com, technical presentation, "AGDC Per–Pixel Shading" (Nov. 15, 2000).

NVIDIA.com, technical presentation, Introduction to DX8 Pixel Shaders (Nov. 10, 2000).

NVIDIA.com, technical presentation, "Advanced Pixel Shader Details" (Nov. 10, 2000).

"Developer's Lair, Multitexturing with the ATI Rage Pro," (7 pages) from ati.com web site (2000).

Slide Presentation, Sébastien Dominé, "nVIDIA Mesh Skinning, OpenGl".

Singh, Karan et al., "Skinning Characters using Surface–Oriented Free–Form Deformations," Toronto Canada.

"Hardware Technology," from ATI.com web site, 8 pages (2000).

"Skeletal Animation and Skinning," from ATI.com web site, 2 pages (Summer 2000).

"Developer Relations, ATI Summer 2000 Developer Newsletter," from ATI.com web site, 5 pages (Summer 2000).

Press Releases, "ATI's RADEON family of products delivers the most comprehensive support for the advance graphics features of DirectX 8.0," Canada, from ATI.com web site, 2 pages (Nov. 9, 2000).

"ATI RADEON Skinning and Tweening," from ATI.com web site, 1 page (2000).

Hart, Evan et al., "Vertex Shading with Direct3D and OpenGL," Game Developers Conference 2001, from ATI.com web site (2001).

Search Results for: skinning, from ATI.com web site, 5 pages (May 24, 2001).

Hart, Evan et al., "Graphics by rage," Game Developers Conference 2000, from ATI.com web site (2000).

Efficient Command/Data Interface Protocol For Graphics, IBM TDB, vol. 36, issue 9A, Sep. 1, 1993, pp. 307–312.

Shade, Jonathan et al., "Layered Depth Images," Computer Graphics Proceedings, Annual Conference Series, pp. 231–242 (1998).

Videum Conference Pro (PCI) Specification, product of Winnov (Winnov), published Jul. 21, 1999.

Whitepaper: Implementing Fog in Direct3D, Jan. 3, 2000, www.nvidia.com.

Akeley, Kurt, "Reality Engine Graphics", 1993, Silicon Graphics Computer Systems, pp. 109–116.

White paper, Huddy, Richard, "The Efficient Use of Vertex Buffers," (Nov. 01, 2000).

White paper, Spitzer, John, et al., "Using GL_NV_array_range and GL_NV_Fence on GEForce Products and Beyone" (Aug. 1, 2000).

White paper, Rogers, Douglas H., "Optimizing Direct3D for the GeForce 256" (Jan. 3, 2000).

White paper, "Technical Brief, AGP 4X With Fast Writes—A Unique NVIDIA GeForce 256 Feature" (Nov. 10, 1999).

Hoppe, Hugues, "Optimization of Mesh Locality for Transparent Vertex Caching," *Proceedings of SIGGRAPH*, pp. 269–276 (Aug. 8–13, 1999).

Hook, Brian, "An Incomplete Guide to Programming DirectDraw and Direct3D Immediate Mode (Release 0.46)," printed from web site: www.wksoftware.com, 42 pages.

Thompson, Tom, "Must–See 3–D Engines," BYTE Magazine, printed from web site www.byte.com, 10 pages (Jun. 1996).

Thompson, Nigel, "Rendering with Immediate Mode," Microsoft Interactive Developer Column: Fun and Games, printed from web site msdn.microsoft.com, 8 pages (Mar. 97).

"HOWTO: Animate Textures in Direct3D Immediate Mode," printed from web site support.microsoft.com, 3 pages (last reviewed Dec. 15, 2000).

"INFO: Rendering a Triangle Using an Execute Buffer," printed from web site support.microsoft.com, 6 pages (last reviewed Oct. 20, 2000).

* cited by examiner

*Vertex Attribute Table*

VERTEX CACHE FOR 3D COMPUTER GRAPHICS

This application claims the benefit of Provisional application Ser. No. 60/161,915, filed Oct. 28, 1999.

FIELD OF THE INVENTION

The present invention relates to 3D interactive computer graphics, and more specifically, to arrangements and techniques for efficiently representing and storing vertex information for animation and display processing. Still more particularly, the invention relates to a 3D graphics integrated circuit including a vertex cache for more efficient imaging of 3D polygon data.

BACKGROUND AND SUMMARY OF THE INVENTION

Modem 3D computer graphics systems construct animated displays from display primitives, i.e., polygons. Each display object (e.g., a tree, a car, or a person or other character) is typically constructed from a number of individual polygons. Each polygon is represented by its vertices—which together specify the location, orientation and size of the polygon in three-dimensional space—along with other characteristics (e.g., color, surface normals for shading, textures, etc.). Computer techniques can efficiently construct rich animated 3D graphical scenes using these techniques.

Low cost, high speed interactive 3D graphics systems such as video game systems are constrained in terms of memory and processing resources. Therefore, in such systems it is important to be able to efficiently represent and process the various polygons representing a display object. For example, it is desirable to make the data representing the display object compact, and to present the data to the 3D graphics system in a way so that all of the data needed for a particular task is conveniently available.

One can characterize data in terms of temporal locality and spatial locality. Temporal locality means the same data is being referenced frequently in a small amount of time. In general, the polygon-representing data for typical 3D interactive graphics applications has a large degree of temporal locality. Spatial locality means that the next data item referenced is stored close in memory to the last one referenced. Efficiency improvements can be realized by increasing the data's spatial locality. In a practical memory system that does not allow unlimited low-latency random access to an unlimited amount of data, performance is increased if all data needed to perform a given task is stored close together in low-latency memory.

To increase the spatial locality of the data, one can sort the polygon data based on the order of processing—assuring that all of the data needed to perform a particular task will be presented at close to the same time so it can be stored together. For example, polygon data making up animations can be sorted in a way that is preferential to the type of animation being performed. As one example, typical complex interactive real-time animation such as surface deformation requires manipulation of all the vertices at the surfaces. To perform such animation efficiently, it is desirable to sort the vertex data in a certain way.

Typical 3D graphical systems perform animation processing and display processing separately, and these separate steps process the data differently. Unfortunately, the optimal order to sort the vertex data for animation processing is generally different from the optimal sort order for display processing. Sorting for animation may tend to add randomness to display ordering. By sorting a data stream to simplify animation processing, we make it harder to efficiently display the data.

Thus, for various reasons, it may not be possible to assume that spatial locality exists when accessing data for display. Difficulty arises from the need to efficiently access an arbitrarily large display object. In addition, for the reasons explained above, there will typically be some amount of randomness—at least for display purposes—in the order the vertex data is presented to the display engine. Furthermore, there may be other data locality above the vertex level that would be useful to implement (e.g., grouping together all polygons that share a certain texture).

One approach to achieving higher efficiency is to provide additional low-latency memory (e.g., the lowest latency memory system affordable). It might al so be possible to fit a display object in fast local memory to achieve random access. However, objects can be quite large, and may need to be double-buffered. Therefore, the buffers required for such an approach could be very large. It might also be possible to use a main CPU's data cache to assemble and sort the polygon data in an optimal order for the display engine. However, to do this effectively, there would have to be some way to prevent the polygon data from thrashing the rest of the data cache. In addition, there would be a need to prefetch the data to hide memory latency—since there will probably be some randomness in the way even data sorted for display order is accessed. Additionally, this approach would place additional loading on the CPU—especially since there might be a need in certain implementations to assemble the data in a binary format the display engine can interpret. Using this approach, the main CPU and the display engine would become serial, with the CPU feeding the data directly to the graphics engine. Parallelizing the processing (e.g., to feed the display engine through a DRAM FIFO buffer) would require substantial additional memory access bandwidth as compared to immediate-mode feeding.

Thus, there exists a need for more efficient techniques that can be used to represent, store and deliver polygon data for a 3D graphics display process.

The present invention solves this problem by providing a vertex cache to organize indexed primitive vertex data streams.

In accordance with one aspect provided by the present invention, polygon vertex data is fed to the 3D graphics processor/display engine via a vertex cache. The vertex cache may be a small, low-latency memory that is local to (e.g., part of) the 3D graphics processor/display engine hardware. Flexibility and efficiency results from the cache providing a virtual memory view much larger than the actual cache contents.

The vertex cache may be used to build up the vertex data needed for display processing on the fly on an as-needed basis. Thus, rather than pre-sorting the vertex data for display purposes, the vertex cache can simply fetch the relevant blocks of data on an as-needed basis to make it available to the display processor. Based on the high degree of temporal locality exhibited by the vertex data for interactive video game display and the use of particularly optimal indexed-array data structures (see below), most of the vertex data needed at any given time will be available in even a small set-associative vertex cache having a number of cache lines proportional to the number of vertex data streams. One example optimum arrangement provides a 512×128-bit dual ported RAM to form an 8 set-associative vertex cache.

Efficiency can be increased by customizing and optimizing the vertex cache and associated tags for the purpose of delivering vertices to the 3D graphics processor/display engine—allowing more efficient prefetching and assembling of vertices than might be possible using a general-purpose cache and tag structure. Because the vertex cache allows data to be fed directly to the display engine, the cost of additional memory access bandwidth is avoided. Direct memory access may be used to efficiently transfer vertex data into the vertex cache.

To further increase the efficiencies afforded by the vertex cache, it is desirable to reduce the need to completely re-specify a particular polygon or set of polygons each time it is (they are) used. In accordance with a further aspect provided by the present invention, polygons can be represented as arrays, e.g., linear lists of data components representing some feature of a vertex (for example, positions, colors, surface normals, or texture coordinates). Each display object may be represented as a collection of such arrays along with various sets of indices. The indices reference the arrays for a particular animation or display purpose. By representing polygon data as indexed component lists, discontinuities are allowed between mappings. Further, separating out individual components allows data to be stored more compactly (e.g., in a fully compressed format). The vertex cache provided by the present invention can accommodate streams of such indexed data up to the index size.

Through use of an indexed vertex representation in conjunction with the vertex cache, there is no need to provide any resorting for display purposes. For example, the vertex data may be presented to the display engine in a order presorted for animation as opposed to display—making animation a more efficient process. The vertex cache uses the indexed vertex data structure representation to efficiently make the vertex data available to the display engine without any need for explicit resorting.

Any vertex component can be index-referenced or directly inlined in the command stream. This enables efficient data processing by the main processor without requiring the main processor's output to conform to the graphics display data structure. For example, lighting operations performed by the main processor may generate only a color array from a list of normals and positions by loop-processing a list of lighting parameters to generate the color array. There is no need for the animation process to follow a triangle list display data structure, nor does the animation process need to reformat the data for display. The display process can naturally consume the data provided by the animation process without adding substantial data reformatting overhead to the animation process.

On the other hand, there is no penalty for sorting the vertex data in display order; the vertex data is efficiently presented to the display engine in either case, without the vertex cache significantly degrading performance vis-a-vis a vertex presentation structure optimized for presenting data presorted for display.

In accordance with a further aspect provided by this invention, the vertex data includes quantized, compressed data streams in any of several different formats (e.g., 8-bit fixed point, 16-bit fixed point, or floating point). This data can be indexed (i.e., referenced by the vertex data stream) or direct (i.e., contained within the stream itself). These various data formats can all be stored in the common vertex cache, and subsequently decompressed and converted into a common format for the graphics display pipeline. Such hardware support of flexible types, formats and numbers of attributes as either immediate or indexed input data avoids complex and time-consuming software data conversion.

BRIEF DESCRIPTION OF THE DRAWINGS

These and other features and advantages provided by the present invention will be better and more completely understood by referring to the following detailed description of preferred embodiments in conjunction with the drawings of which.

DETAILED DESCRIPTION OF PRESENTLY PREFERRED EXAMPLE EMBODIMENTS

Figure 1:
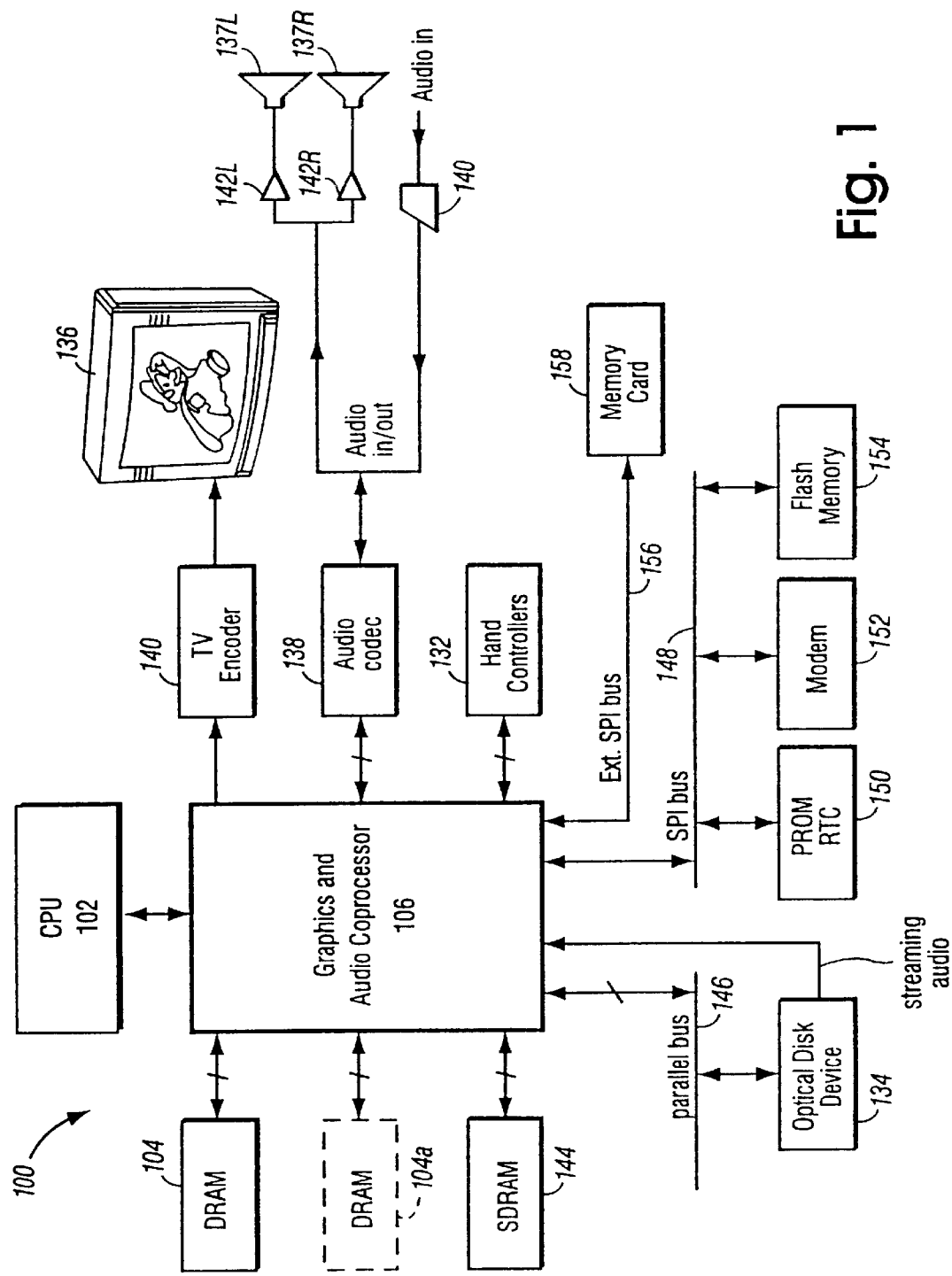
FIG. 1 is a block diagram of an example interactive 3D graphics system.

FIG. 1 is a schematic diagram of an overall example interactive 3D computer graphics system 100 in which the present invention may be practiced. System 100 can be used to play interactive 3D video games accompanied by interesting stereo sound. Different games can be played by inserting appropriate storage media such as optical disks into an optical disk player 134. A game player can interact with system 100 in real time by manipulating input devices such as handheld controllers 132, which may include a variety of controls such as joysticks, buttons, switches, keyboards or keypads, etc.

System 100 includes a main processor (CPU) 102, a main memory 104, and a graphics and audio coprocessor 106. In this example, main processor 102 receives inputs from handheld controllers 132 (and/or other input devices) via coprocessor 100. Main processor 102 interactively responds to such user inputs, and executes a video game or other graphics program supplied, for example, by external storage 134. For example, main processor 102 can perform collision detection and animation processing in addition to a variety of real time interactive control functions.

Main processor 102 generates 3D graphics and audio commands and sends them to graphics and audio coprocessor 106. The graphics and audio coprocessor 106 processes these commands to generate interesting visual images on a display 136 and stereo sounds on stereo loudspeakers 137R, 137L or other suitable sound-generating devices.

System 100 includes a TV encoder 140 that receives image signals from coprocessor 100 and converts the image signals into composite video signals suitable for display on a standard display device 136 (e.g., a computer monitor or home color television set). System 100 also includes an audio codec (compressor/decompressor) 138 that compresses and decompresses digitized audio signals (and may also convert between digital and analog audio signalling formats). Audio codec 138 can receive audio inputs via a buffer 140 and provide them to coprocessor 106 for processing (e.g., mixing with other audio signals the coprocessor generates and/or receives via a streaming audio output of optical disk device 134). Coprocessor 106 stores audio related information in a memory 144 that is dedicated to audio tasks. Coprocessor 106 provides the resulting audio output signals to audio codec 138 for decompression and conversion to analog signals (e.g., via buffer amplifiers 142L, 142R) so they can be played by speakers 137L, 137R.

Coprocessor 106 has the ability to communicate with various peripherals that may be present within system 100. For example, a parallel digital bus 146 may be used to communicate with optical disk device 134. A serial peripheral bus 148 may communicate with a variety of peripherals including, for example, a ROM and/or real time clock 150, a modem 152, and flash memory 154. A further external serial bus 156 may be used to communicate with additional expansion memory 158 (e.g., a memory card).

Graphics And Audio Coprocessor

Figure 1A:
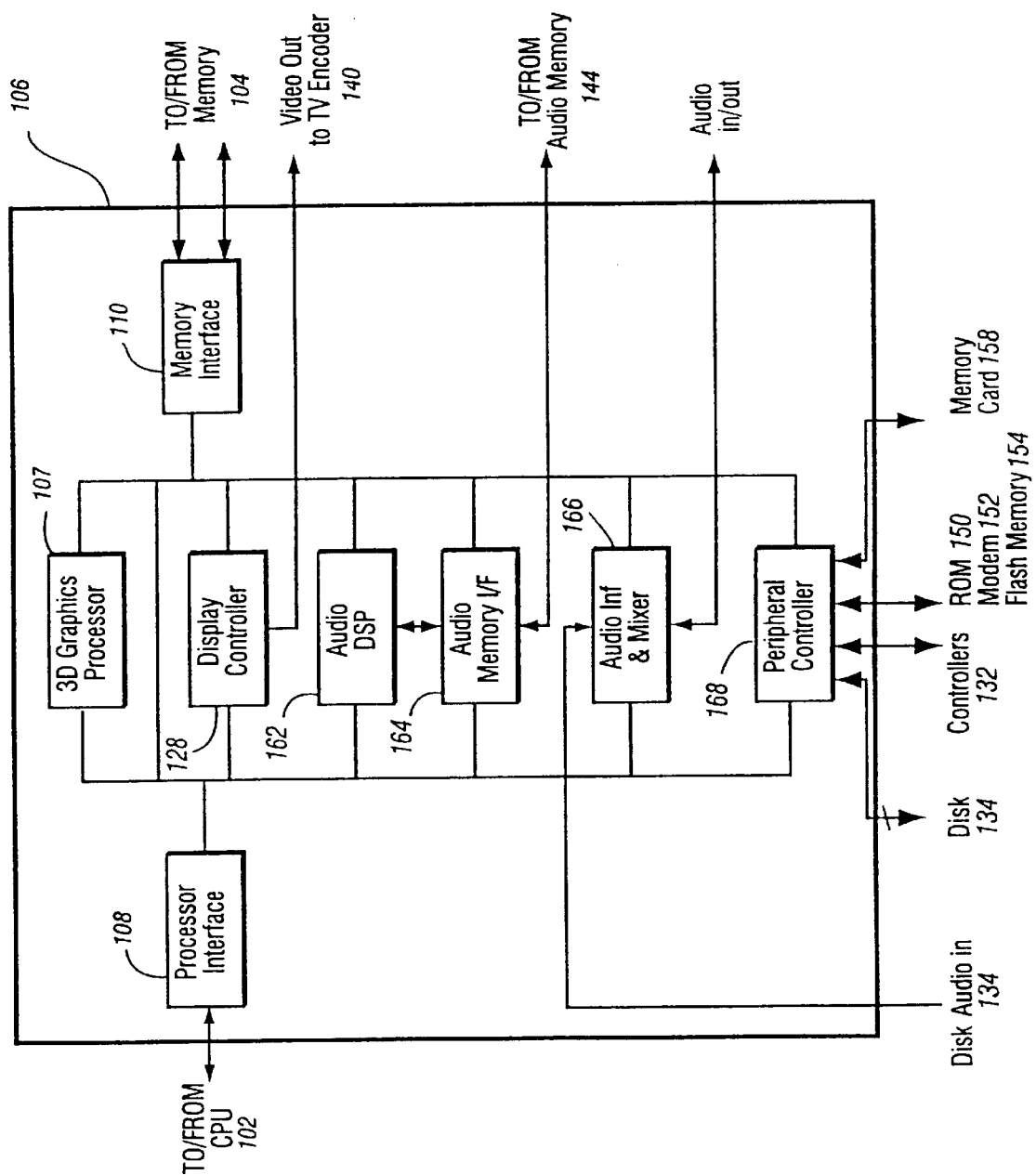
FIG. 1A is a block diagram of the example graphics and audio coprocessor shown in FIG. 1.

FIG. 1A is a block diagram of components within coprocessor 106. Coprocessor 106 may be a single integrated circuit. In this example, coprocessor 106 includes a 3D graphics processor/display engine 107, a processor interface 108, a memory interface 110, an audio digital signal processor (DSP) 162, an audio memory interface (I/F) 164, an audio interface and mixer 166, a peripheral controller 168, and a display controller 128.

3D graphics processor/display engine 107 performs graphics processing tasks, and audio digital signal processor 162 performs audio processing tasks. Display controller 128 accesses image information from memory 104 and provides it to TV encoder 140 for display on display device 136. Audio interface and mixer 166 interfaces with audio codec 138, and can also mix audio from different sources (e.g., a streaming audio input from disk 134, the output of audio DSP 162, and external audio input received via audio codec 138). Processor interface 108 provides a data and control interface between main processor 102 and coprocessor 106. Memory interface 110 provides a data and control interface between coprocessor 106 and memory 104. In this example, main processor 102 accesses main memory 104 via processor interface 108 and memory controller 110 that are part of coprocessor 106. Peripheral controller 168 provides a data and control interface between coprocessor 106 and the various peripherals mentioned above (e.g., optical disk device 134, controllers 132, ROM and/or real time clock 150, modem 152, flash memory 154, and memory card 158). Audio memory interface 164 provides an interface with audio memory 144.

Figure 1B:
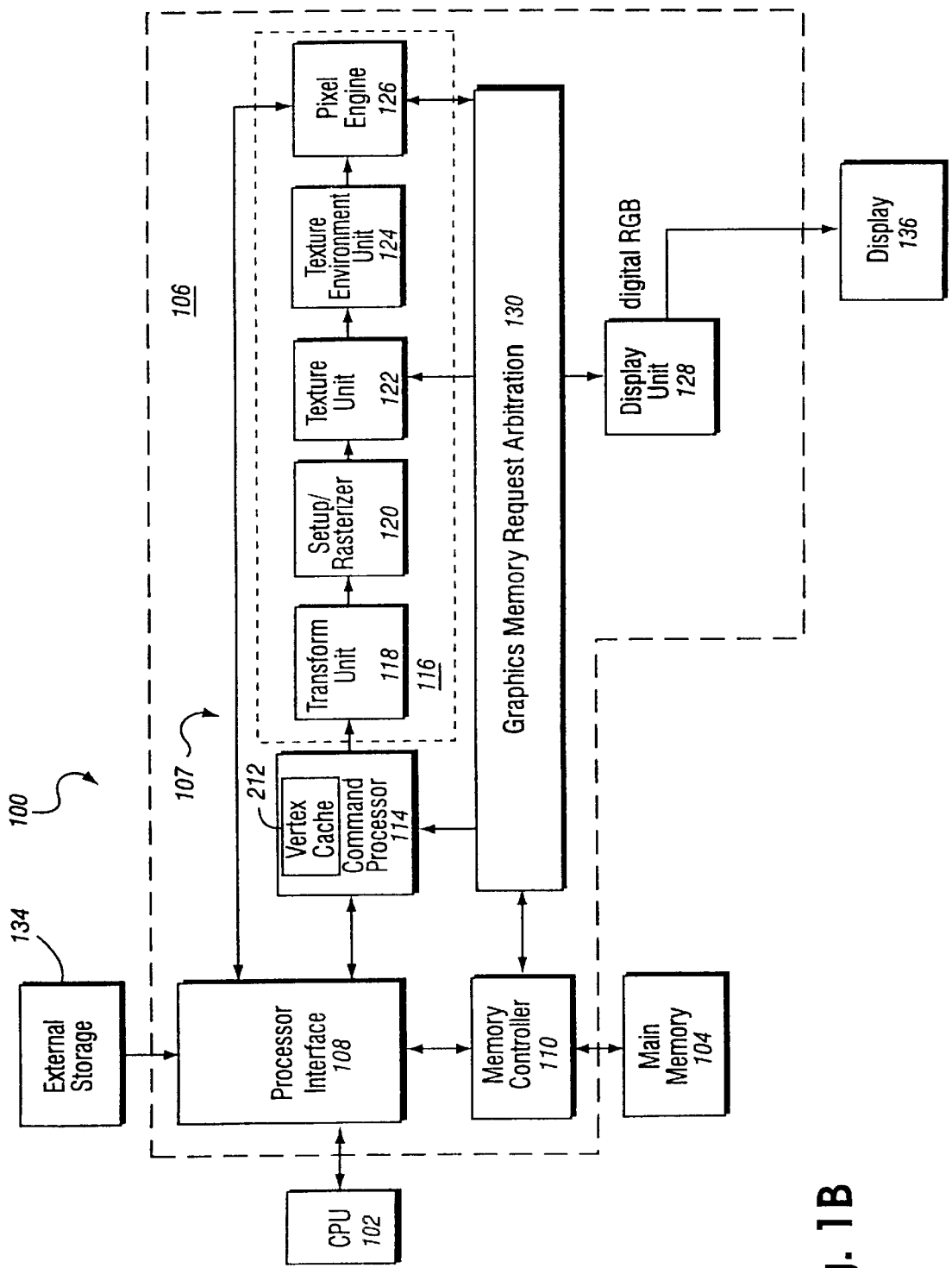
FIG. 1B is a more detailed schematic diagram of portions of the FIG. 1A graphics and audio coprocessor showing an example 3D pipeline graphics processing arrangement.

FIG. 1B shows a more detailed view of 3D graphics processor/display engine 107 and associated components within coprocessor 106. 3D graphics processor/display engine 107 includes a command processor 114 and a 3D graphics pipeline 116. Main processor 102 communicates streams of graphics data (i.e., display lists) to command processor 114. Command processor 114 receives these display commands and parses them (obtaining any additional data necessary to process them from memory 104), and provides a stream of vertex commands to graphics pipeline 116 for 3D processing and rendering. Graphics pipeline 116 generates a 3D image based on these commands. The resulting image information may be transferred to main memory 104 for access by display controller 128—which displays the frame buffer output of pipeline 116 on display 136.

In more detail, main processor 102 may store display lists in main memory 104, and pass pointers to command processor 114 via bus interface 108. The command processor 114 (which includes a vertex cache 212 discussed in detail below) fetches the command stream from CPU 102, fetches vertex attributes from the command stream and/or from vertex arrays in memory, converts attribute types to floating point format, and passes the resulting complete vertex polygon data to the graphics pipeline 116 for rendering/rasterization. As explained in more detail below, vertex data can come directly from the command stream, and/or from a vertex array in memory where each attribute is stored in its own linear array. A memory arbitration circuitry 130 arbitrates memory access between graphics pipeline 116, command processor 114 and display unit 128. As explained below, an on-chip 8-way set-associative vertex cache 212 is used to reduce vertex attribute access latency.

As shown in FIG. 1B, graphics pipeline 116 may include transform unit 118, a setup/rasterizer 120, a texture unit 122, a texture environment unit 124 and a pixel engine 126. In graphics pipeline 116, transform unit 118 performs a variety of 3D transform operations, and may also perform lighting and texture effects. For example, transform unit 118 transforms incoming geometry per vertex from object space to screen space; transforms incoming texture coordinates and computes projective texture coordinates; performs polygon clipping; performs per vertex lighting computations; and performs bump mapping texture coordinate generation. Set up/rasterizer 120 includes a set up unit which receives vertex data from the transform unit 118 and sends triangle set up information to rasterizers performing edge rasterization, texture coordinate rasterization and color rasterization. Texture unit 122 performs various tasks related to texturing, including multi-texture handling, post-cache texture decompression, texture filtering, embossed bump mapping, shadows and lighting through the use of projective textures, and BLIT with alpha transparency and depth. Texture unit 122 outputs filtered texture values to the texture environment unit 124. Texture environment unit 124 blends the polygon color and texture color together, performing texture fog and other environment-related functions. Pixel engine 126 performs z buffering and blending, and stores data into an on-chip frame buffer memory.

Thus, graphics pipeline 116 may include one or more embedded DRAM memories (not shown) to store-frame buffer and/or texture information locally. The on-chip frame buffer is periodically written to main memory 104 for access by display unit 128. The frame buffer output of graphics pipeline 116 (which is ultimately stored in main memory 104) is read each frame by display unit 128. Display unit 128 provides digital RGB pixel values for display on display 136.

Vertex Cache And Vertex Index Array

Figure 2:
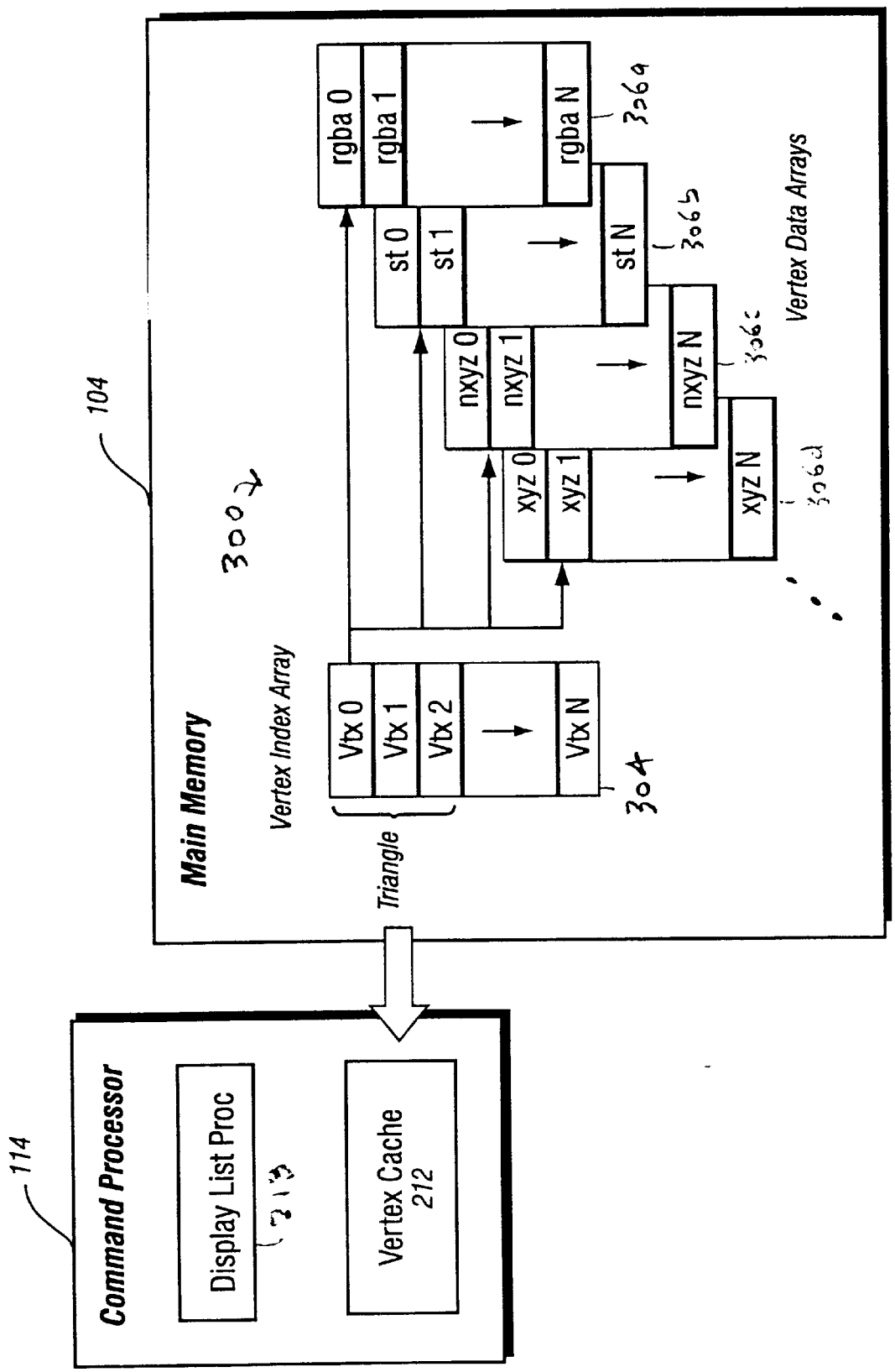
FIG. 2 shows an example command processor including a vertex cache provided with vertex index array data.

FIG. 2 is a schematic illustration of command processor 114 including a vertex cache 212 and a display list processor 213. Command processor 114 handles a wide range of vertex and primitive data structures, from a single stream of vertex data containing position, normal, texture coordinates and colors to fully indexed arrays. Any vertex component can be index-referenced or directly in-lined in the command stream. Command processor 114 thus supports flexible types, formats and numbers of attributes as either immediate or indexed data.

Display list processor 213 within command processor 114 processes display list commands provided by CPU 102—typically via a buffer allocated within main memory 104. Vertex cache 212 caches indexed polygon vertex data structures such as the example data structure 300 shown in FIG. 2. Example indexed polygon vertex data structure 300 may include a vertex index array 304 which references a number of vertex component data arrays (e.g., a color data array 306*a*, a texture vertex data array 306*b*, a surface normal data array 306*c*, a position vertex data array 306*d*, and so on). Vertex cache 212 accesses the vertex data from these arrays 306 in main memory 104, and caches them for fast access and use by display list processor 213.

Display List Processor

Figure 2A:
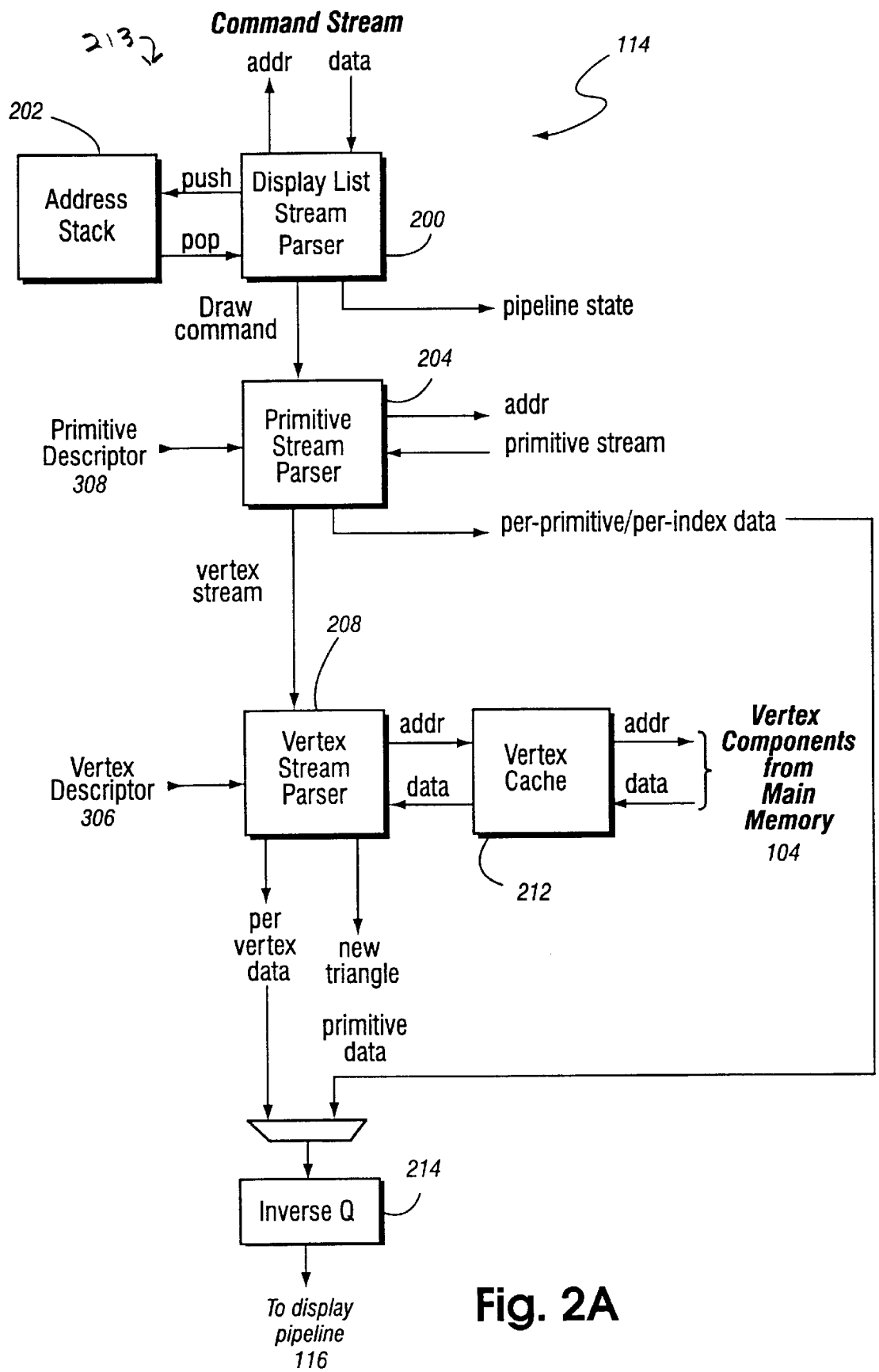
FIG. 2A shows an example display list processor including a vertex cache provided in accordance with the present invention.
Figure 2B:
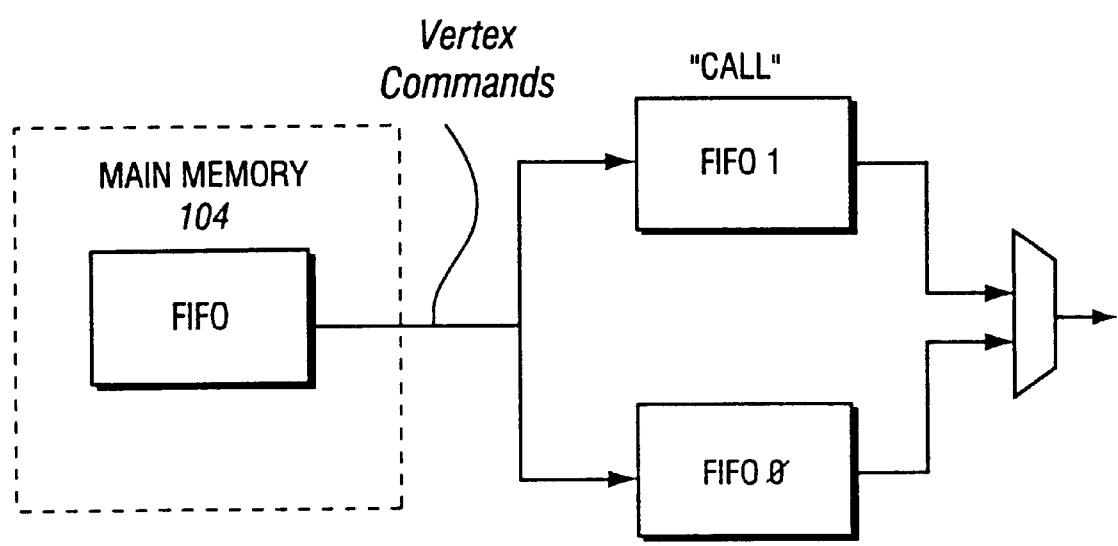
FIG. 2B shows an example dual FIFO arrangement.

FIG. 2A shows example display list processor 213 performed by command processor 114. In this FIG. 2A example, display list processor 213 provides several stages of parsing. Display list commands received from main processor 102 are interpreted by a display list stream parser 200. Display list stream parser 200 may use an address stack 202 to provide nesting of instructions—or dual FIFOS may be used to store a stream of vertex commands from a FIFO in main memory 106 to allow subroutine branching in instancing (see FIG. 2B) without need for reloading prefetched vertex command data. Using the FIG. 2B approach, the display list commands may thus provide for a one-level-deep display list—where the top level command stream can call the display list one level deep. This "call" capability is useful for pre-computed commands and instancing in geometry.

Display list stream parser 200 routes commands that affect the state of graphics pipeline 116 to the graphics pipeline. The remaining primitive command stream is parsed by a primitive stream parser 204 based on a primitive descriptor obtained from memory 104 (see below).

The indices to vertices are de-referenced and parsed by a vertex stream parser 208 based on a vertex descriptor 306 which may be provided in a table in hardware. The vertex stream provided to vertex stream parser 208 may include such indices to vertex data stored within main memory 104. Vertex stream parser 208 can access this vertex data from main memory 104 via vertex cache 212—thus separately providing the vertex commands and associated referenced vertex attributes via different paths in the case of indexed as opposed to direct data. In one example, vertex stream parser 208 addresses vertex cache 212 as if it were the entirety of main memory 104. Vertex cache 212, in turn, retrieves (and often times, may prefetch) vertex data from main memory 104, and caches it temporarily for use by vertex stream parser 208. Caching the vertex data in vertex cache 212 reduces the number of accesses to main memory 104—and thus the main memory bandwidth required by command processor 114.

Vertex stream parser 208 provides data for each vertex to be rendered within each triangle (polygon). This per-vertex data is provided, along with the per-primitive data outputted by primitive stream parser 204, to a decompression/inverse quantizer block 214. Inverse quantizer 214 converts different vertex representations (e.g., 8-bit and 16-bit fixed point format data) to a uniform floating-point representation used by graphics pipeline 116. Inverse quantizer 214 provides hardware support for a flexible variety of different types, formats and numbers of attributes, and such data can be presented to display list processor 213 as either immediate or indexed input data. The uniform floating-point representation output of inverse quantizer 214 is provided to graphics pipeline 116 for rasterization and further processing. If desired as an optimization, a further small cache or buffer may be provided at the output of inverse quantizer 214 to avoid the need to re-transform vertex strip data.

Vertex Index Array

Figure 3:
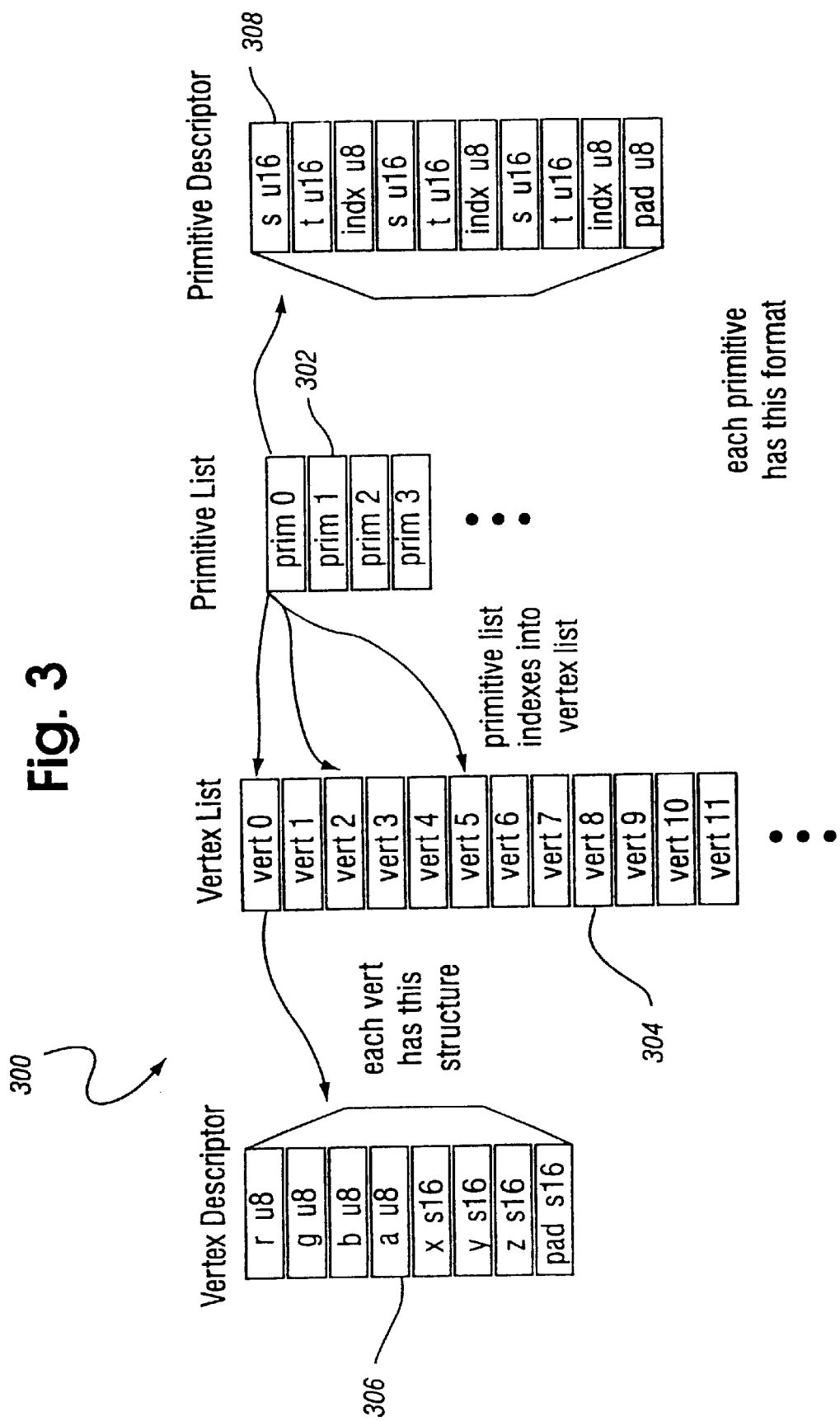
FIG. 3 is a schematic diagram of an example indexed vertex data structure.

FIG. 3 shows a more detailed example of an indexed vertex list 300 of the preferred embodiment used to provide indirect (i.e., indexed) vertex attribute data via vertex cache 212. This generalization indexed vertex list 300 may be used to define primitives in the system shown in FIG. 1. Each primitive is described by a list of indices, each of which indexes into an array of vertices. Vertices and primitives each use format descriptors to define the types of their items. These descriptors associate an attribute with a type. An attribute is a data item that has a specific meaning to the rendering hardware. This affords the possibility of programming the hardware with descriptors so it can parse and convert the vertex/primitive stream as it is loaded. Using the minimum size type and the minimum number of attributes per vertex leads to geometry compression. The FIG. 3 arrangement also allows attributes to be associated with the vertices, the indices, or the primitive, as desired.

Thus, in the FIG. 3 example indexed vertex array 300, a primitive list 302 defines each of the various primitives (e.g., triangles) in the data stream (e.g., prim0, prim1, prim2, prim3, . . . ). A primitive descriptor block 308 may provide attributes common to a primitive (e.g., texture and connectivity data which may be direct or indexed). Each primitive within primitive list 302 indexes corresponding vertices within a vertex list 304. A single vertex within vertex list 304 may be used by multiple primitives within primitive list 302. If desired, primitive list 302 may be implied rather than explicit—i.e., vertex list 304 can be ordered in such a way as to define corresponding primitives by implication (e.g., using triangle strips).

A vertex descriptor block 306 may be provided for each vertex within vertex list 304. Vertex descriptor block 306 includes attribute data corresponding to a particular vertex (e.g., rgb or other color data, alpha data, xyz surface normal data). As shown in FIG. 2, vertex descriptor block 306 may comprise a number of different indexed component blocks. The vertex attribute descriptor block 306 10 defines which vertex attributes are present, the number and size of the components, and how the components are referenced (e.g., either direct—that is, included within the quantized vertex data stream—or indexed). In one example, the vertices in a DRAW command for a particular primitive all have the same vertex attribute data structure format.

Figure 3A:
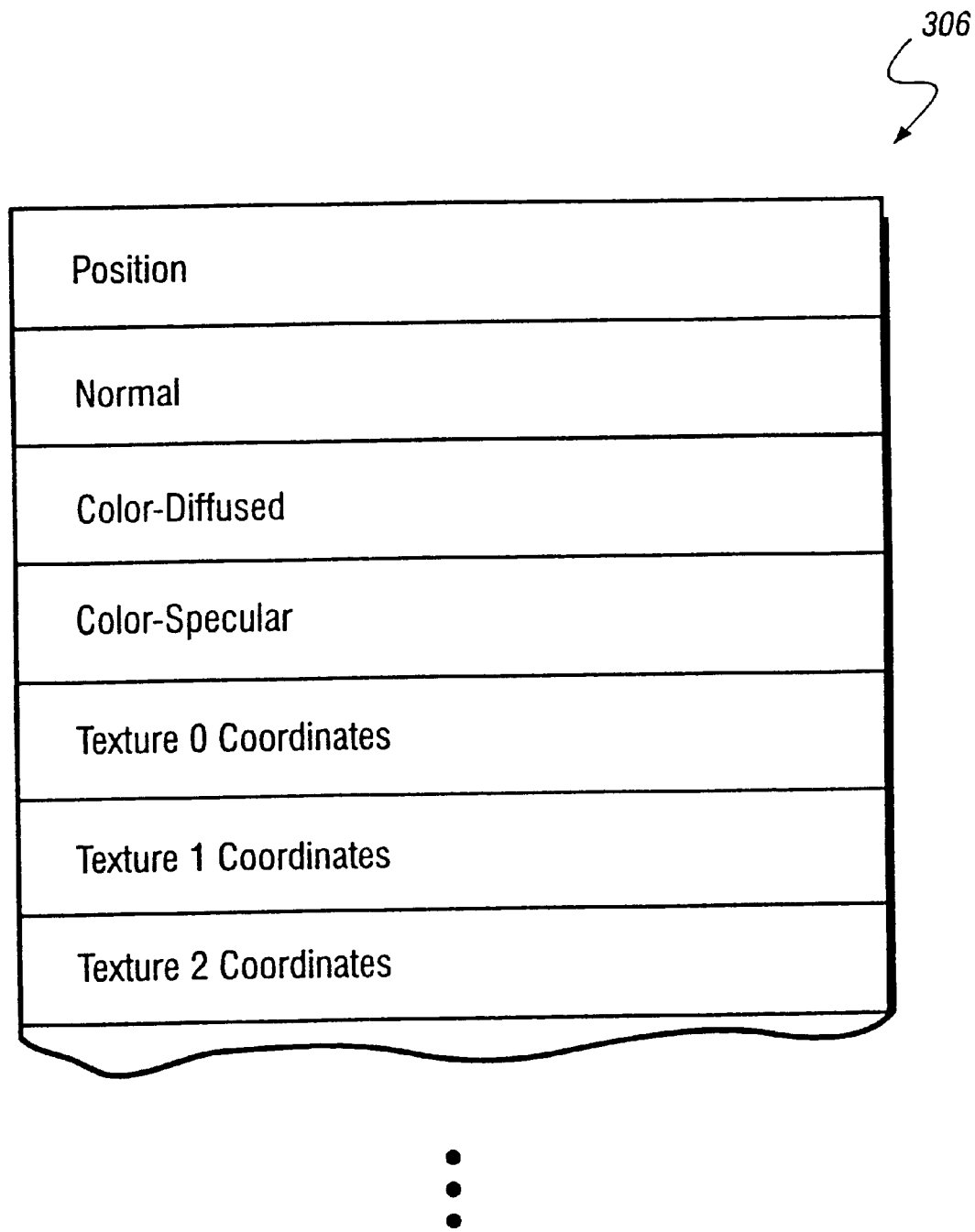
FIG. 3A shows an example vertex descriptor block.

FIG. 3A shows an example list of attributes provided by vertex attribute block 306. The following attributes may be provided:

| Attribute |
|---|
| Position |
| Normal |
| Diffused Color |
| Specular Color |

-continued

| Attribute |
|---|
| (Skinning) |
| Texture 0 Coordinate |
| Texture 1 Coordinate |
| Texture 2 Coordinate |
| Texture 3 Coordinate |
| Texture 4 Coordinate |
| Texture 5 Coordinate |
| Texture 6 Coordinate |
| Texture 7 Coordinate |

In this example vertex attribute descriptor block 306, the position attribute is always present, may be either indexed or direct, and can take a number of different quantized, compressed formats (e.g., floating point, 8-bit, integer, or 16-bit). All remaining attributes may or may not be present for any given vertex, and may be either indexed or direct as desired. The texture coordinate values may, like the position values, be represented in a variety of different formats (e.g., 8-bit integer, 16-bit integer or floating point), as can the surface normal attribute. The diffused and specular color attributes may provide 3 (rgb) or 4 (rgba) values in a variety of formats including 16-bit threes-complement, 24-bit threes-complement, 32-bit threes-complement, or 16-, 24- or 32-bit fours-complement representations). All vertices for a given primitive preferably have the same format.

In this example, vertex descriptor 306 references indexed data using a 16-bit pointer into an array of attributes. A particular offset used to access a particular attribute within the array depends upon a number of factors including, e.g., the number of components in the attribute; the size of the components, padding between attributes for alignment purposes; and whether multiple attributes are interleaved in the same array. A vertex can have direct and indirect attributes intermixed, and some attributes can be generated by the hardware (e.g., generating a texture coordinate from a position). Any attribute can be sent either directly or as an index into an array. Vertex cache 212 includes sufficient cache lines to handle the typical number of respective data component streams (e.g., position, normal, color and texture) without too many cache misses.

Vertex Cache Implementation

Figure 4:
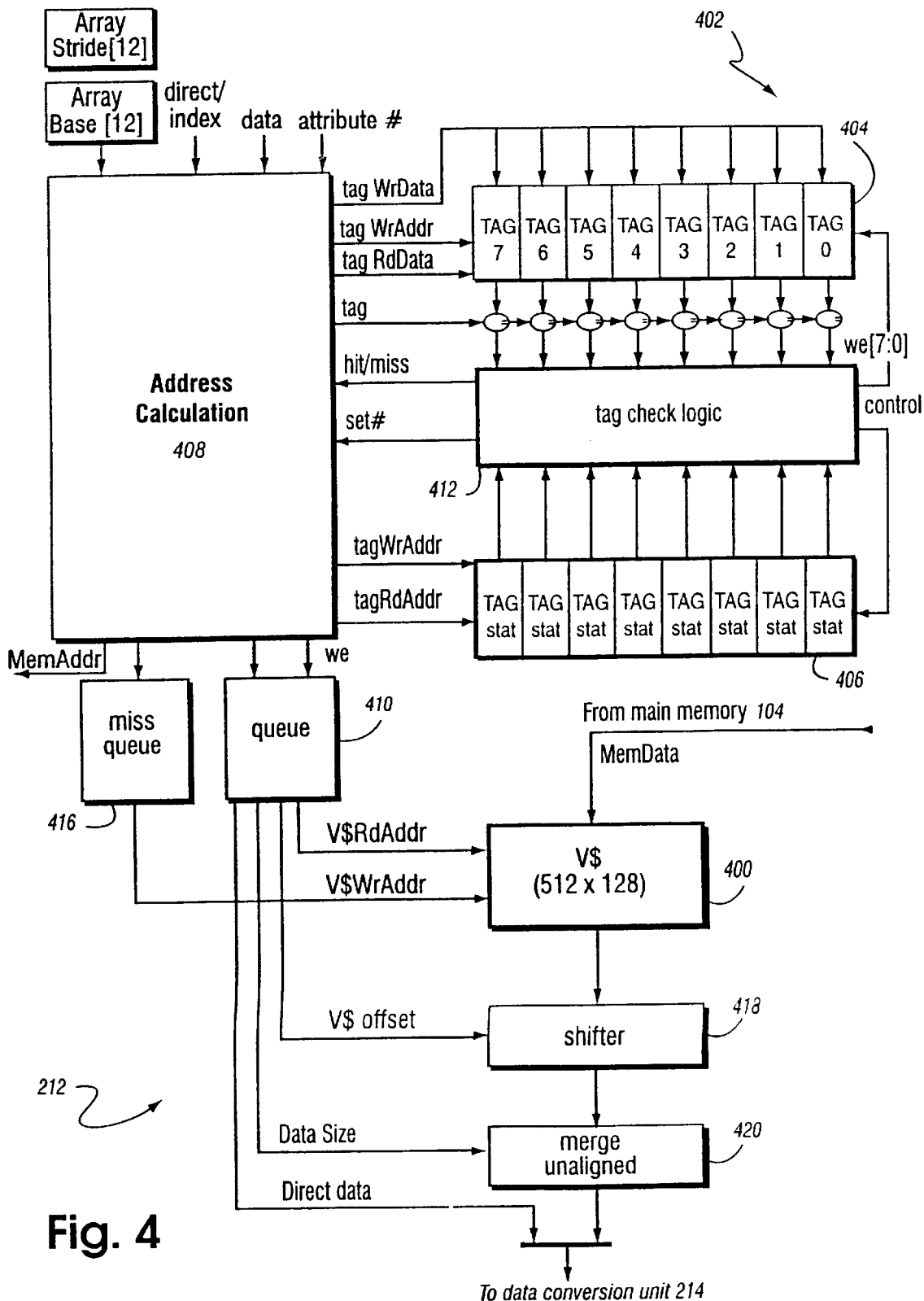
FIG. 4 is a block diagram of an example vertex cache implementation.

FIG. 4 shows an example schematic diagram of vertex cache 212 and associated logic. Vertex cache 212 in this example includes an 8-Kilobyte cache memory 400 organized as a 512×128-bit dual ported RAM. Since there are multiple attribute streams being looked up in the cache 212, an eight set-associative cache including eight tag lines 402 is used to reduce thrashing. Each tag line includes a 32×16 bit dual ported tag RAM 404 and associated tag status register 406. Tag RAMS 404 store the main memory address of the corresponding data block stored within vertex RAM 400. Address calculation block 408 determines whether necessary vertex attribute data is already present within vertex RAM 400—or whether an additional fetch to main memory is required. Cache lines are prefetched from main memory 104 to hide memory latency. Data required to process a particular component is stored within a queue 410 having a depth that is proportional to memory latency.

Figure 5:
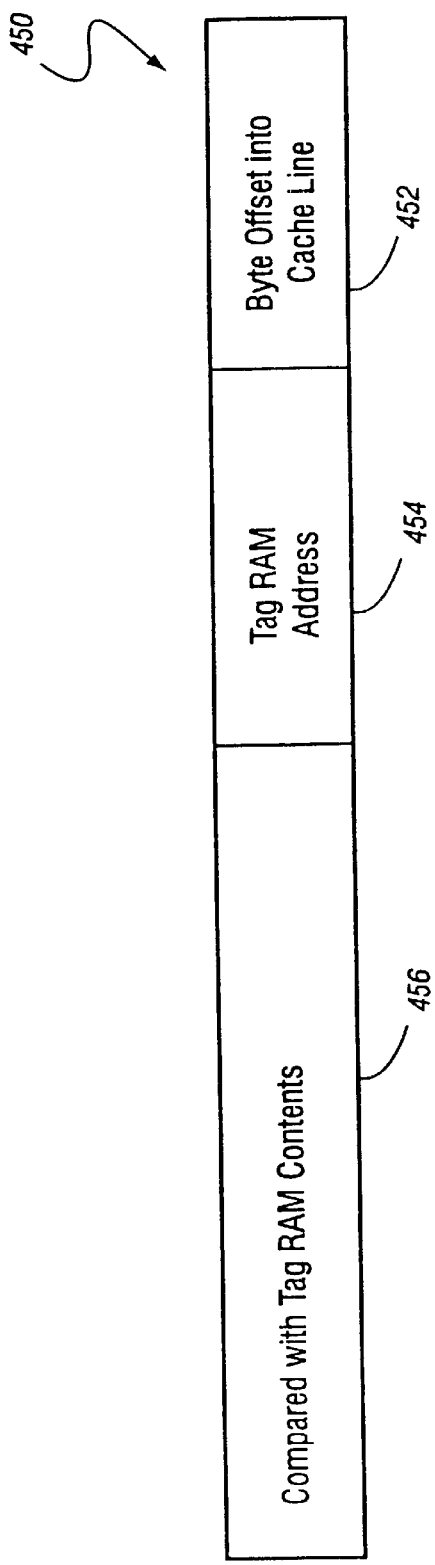
FIG. 5 shows an example vertex cache memory address format.

FIG. 5 shows an example memory address format provided by vertex stream parser 208 to vertex cache 212. This memory address 450 includes a field 452 providing a byte offset into a cache line; a tag RAM address 454; and a main memory address for comparison with the contents of tag RAMs 404. Address calculation block 408 compares the main memory address 456 with the tag RAM 404 contents to determine whether the required data is already cached within vertex RAM 400, or whether it needs to be fetched from main memory 104.

Figure 6:
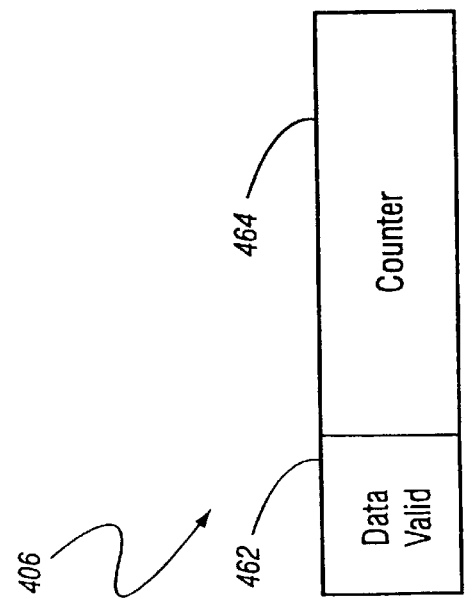
FIG. 6 shows an example vertex cache tag status register format.

The tag status registers 406 store data in the format shown in FIG. 6. A "data valid" field 462 indicates whether the data in that particular cache line is valid. A counter field 464 keeps track of the number of entries in queue 410 that depend on the cache line. Counter field 464 is used in the case that all tag status registers 406 show "data valid" if a miss occurs. Address calculation block 408 then needs to throw one of the cache lines out to make room for the new entry. If counter field 464 is not zero, the cache line is still in use and cannot be thrown away. Based on a modified partial LRU algorithm, address calculation block 408 selects one of the cache lines for replacement. The "data valid" field 462 is set to "invalid", and the cache line is replaced with a new contents from main memory 104. If another attribute index maps to the same cache line, the counter field 464 is incremented. Once the data arrives from main memory 104, the "data valid" bit is set and an entry can be processes from queue 410. Otherwise, the processing of queue 410 will be stalled until the data gets into the cache RAM 400. Once the cache RAM 400 is accessed for the queue entry, counter 464 decrements.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A 3D videographics system including:
   a memory storing polygon vertex data, and
   a 3D graphics engine including a graphics pipeline having at least a transform unit, a rasterizer, a texture unit and a pixel engine, said 3D graphics engine generating and displaying images at least in part in response to said polygon vertex data,
   said 3D graphics engine comprising a vertex cache arrangement operatively coupled to said memory, said vertex cache arrangement caching said polygon vertex data from said memory prior to use by said 3D graphics engine transform unit, wherein said polygon vertex data includes an indexed polygon vertex data structure and said vertex cache arrangement operates in accordance with said indexed polygon vertex data structure representation to cache vertex attribute data and make it available for efficient access by the 3D graphics engine transform unit without requiring explicit resorting of said polygon vertex data for image display.

2. A vertex cache arrangement as in claim 1 wherein 3D graphics engine is disposed on an integrated circuit, and said vertex cache arrangement comprises a memory device disposed on said integrated circuit and operatively coupled to said 3D graphics engine.

3. A vertex cache arrangement as in claim 2 wherein said memory device comprises a set-associative cache memory for caching said vertex data.

4. A vertex cache arrangement as in claim 3 wherein said set-associative cache memory provides eight cache lines.

5. A vertex cache arrangement as in claim 2 wherein said memory device comprises an 8 kilobyte low-latency random access memory.

6. A vertex cache arrangement as in claim 1 including a queue and a miss queue.

7. A vertex cache arrangement as in claim 1 wherein said vertex cache arrangement is coupled to said memory and, in use, fetches vertex data from said memory as said vertex data is needed by said 3D graphics engine.

8. A vertex cache arrangement as in claim 1 further including a hardware-based inverse quantizer operatively coupled between said vertex cache and said 3D graphics engine, said inverse quantizer converting plural vertex data formats into a uniform floating-point format for consumption by said 3D graphics engine.

9. A vertex cache arrangement as in claim 1 wherein said indexed vertex data representation comprises an indexed array referencing attribute data.

10. A vertex cache arrangement as in claim 9 wherein said indexed array directly references said attribute data.

11. A vertex cache arrangement as in claim 1 wherein said indexed polygon vertex data structure comprises an indexed array referencing vertex attribute data.

12. A vertex cache arrangement as in claim 11 wherein said indexed array directly references said attribute data.

13. A vertex cache arrangement as in claim 11 wherein said indexed array indirectly references said attribute data.

14. In a 3D videographics system including a memory storing polygon vertex data, and a 3D graphics engine including a graphics pipeline having at least a transform unit, a rasterizer, a texture unit and a pixel engine, said 3D graphics engine generating and displaying images at least in part in response to said polygon vertex data, a method for caching polygon vertex data prior to use by said 3D graphics engine transform unit, said method including the steps of:

representing said polygon vertex data by an indexed polygon vertex data structure;

retrieving said polygon vertex data from said memory; and caching said polygon vertex data in a low-latency cache memory device local to said 3D graphics engine to make said vertex data available for efficient access by the 3D graphics engine transform unit.

15. A method as in claim 14 further including the step of fetching vertex data from said memory to said cache memory device as said vertex data is needed by said 3D graphics engine.

16. A method as in claim 14 further including the step of converting plural vertex data formats stored in said cache memory device into a uniform floating-point format for consumption by said 3D graphics engine.

17. A 3D videographics system including:

a memory storing polygon vertex data and a 3D graphics pipeline that renders and displays images at least in part in response to said polygon vertex data, wherein said polygon vertex data includes an indexed polygon vertex data structure and said videographics system further comprises a vertex cache operatively coupled to said memory and to a command stream processor, said vertex cache retrieving and caching polygon vertex data from said memory prior to use by said 3D graphics pipeline according to said indexed polygon vertex data structure representation, wherein said vertex data is made available for efficient access by the 3D graphics pipeline without requiring explicit resorting of said polygon vertex data for image display.

18. A vertex data caching arrangement for a 3D videographics system comprising:

a memory storing polygon vertex attribute data and an indexed polygon vertex data structure indexing at least a portion of said polygon vertex attribute data;

a command stream processor that parses at least indices corresponding to said indexed polygon vertex data structure and provides said parsed indices to a low-latency cache memory device;

a low-latency cache memory device operatively coupled to the command stream processor and to said memory, said cache memory device retrieving polygon vertex attribute data from said memory in response to at least parsed indices provided by the command stream processor and caching the retrieved vertex attribute data; and a graphics pipeline coupled to said cache memory device, said graphics pipeline generating image data for displaying at least in part in response to the vertex attribute data cached in said low-latency cache memory device.

19. A memory device storing a 3D graphics command stream for use by a 3D graphics engine of the type including a graphics pipeline having at least a transform unit, a rasterizer, a texture unit and a pixel engine, said 3D graphics engine, in use, generating images for display at least in part in response to said 3D graphics command stream, said 3D graphics engine including a vertex cache that caches polygon vertex data from memory prior to use by said transform unit, said stored graphics command stream including a vertex stream that references indexed polygon vertex attribute data cached in the vertex cache for efficient use by said graphics pipeline without requiring explicit re-ordering of vertices represented by said vertex stream specially for image display.

20. The memory device of claim 19 wherein the vertex stream directly references at least some of the indexed polygon vertex attribute data.

21. The memory device of claim 19 wherein the vertex stream references a vertex descriptor array including color and position attributes.

* * * * *